(12) United States Patent
Baker (10) Patent No.: US 10,444,525 B1
(45) Date of Patent: Oct. 15, 2019

(54) METHODS FOR PRODUCING AN OPTICAL WEDGE OR PRISM ASSEMBLY

(71) Applicant: John L. Baker, Sheridan, IL (US)

(72) Inventor: John L. Baker, Sheridan, IL (US)

( * ) Notice: Subject to any disclaimer, the term of this patent is extended or adjusted under 35 U.S.C. 154(b) by 0 days.

(21) Appl. No.: 15/927,029

(22) Filed: Mar. 20, 2018

Related U.S. Application Data (60) Provisional application No. 62/473,597, filed on Mar. 20, 2017.

(51) Int. Cl.
*G02B 27/10* (2006.01)
*G02B 27/14* (2006.01)

(52) U.S. Cl.
CPC ..... *G02B 27/1073* (2013.01); *G02B 27/1046* (2013.01); *G02B 27/145* (2013.01)

(58) Field of Classification Search
CPC ........ G02B 5/04; G02B 5/045; G02B 27/145; G02B 27/1013; G02B 27/1046; G02B 27/1073

See application file for complete search history.

(56) References Cited

U.S. PATENT DOCUMENTS

| | | | |
|---|---|---|---|
| 3,424,516 A | 1/1969 | Snyder | |
| 5,072,313 A | 12/1991 | Schweitzer et al. | |
| 6,411,449 B1 | 6/2002 | Hashizume et al. | |
| 6,690,521 B2 | 2/2004 | Hashizume et al. | |
| 7,329,006 B2 * | 2/2008 | Aastuen | G02B 27/1026 353/20 |
| 2013/0038933 A1 * | 2/2013 | Wang | G02B 27/283 359/485.04 |
| 2014/0176818 A1 | 6/2014 | Watson et al. | |
| 2015/0212325 A1 * | 7/2015 | Choi | G02B 5/04 359/13 |
| 2015/0338640 A1 * | 11/2015 | Stacey | G02B 26/0816 359/225.1 |
| 2016/0018188 A1 * | 1/2016 | Jahromi | F41G 1/38 359/428 |

FOREIGN PATENT DOCUMENTS

| | | |
|---|---|---|
| GB | 66498 | 2/1952 |
| JP | 03054507 | 3/1991 |
| JP | 04116504 | 4/1992 |
| JP | 08292307 | 4/1995 |
| JP | 08300502 | 11/1996 |
| JP | 2007280523 | 10/2007 |

\* cited by examiner

*Primary Examiner* — Sultan Chowdhury
(74) *Attorney, Agent, or Firm* — Shaddock Law Group, PC (57) ABSTRACT

A method for producing an optical wedge or prism assembly, including identifying a first prism wedge and a second prism wedge, wherein the first prism wedge includes at least one wedge surface and wherein the second prism wedge includes a wedge surface; indexing the first prism wedge and the second prism wedge such that wedge surfaces of the first prism wedge and the second prism wedge are adjacent to one another; applying an adhesive to adjacent wedge surfaces of the aligned prism wedges; manipulating at least one of the prism wedges relative to the other prism wedge to obtain a desired angle between the outer surfaces of the prism wedges; and allowing the adhesive to cure.

20 Claims, 7 Drawing Sheets

METHODS FOR PRODUCING AN OPTICAL WEDGE OR PRISM ASSEMBLY

CROSS-REFERENCE TO RELATED APPLICATIONS

This patent application claims the benefit of U.S. Patent Application Ser. No. 62/473,597, filed Mar. 20, 2017, the entire disclosure of which is incorporated herein by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE PRESENT DISCLOSURE

1. Field of the Present Disclosure

The present disclosure relates generally to the field of prism assembly. More specifically, the presently disclosed systems, methods, and/or apparatuses relate to improved prism assembly methods and/or prism assemblies having improved manufacturing tolerances.

2. Description of Related Art

Typical prism manufacturing costs are driven by the precision required to produce a given prism body. Typical prism production techniques will only allow a 1.5 arc minute tolerance. This 1.5 arc minute value appears to be the statistical limit of known production process.

Prisms are currently produced to single digit tolerances in precision individually hand produced environments. The individually produced part does not lend itself to high levels of production.

It is well understood that as a process hits its statistical process limits, requesting, for example, a 16.8× increase in precision is not practical and is nearly impossible without introducing a new method of production.

Typically tooling is produced with a target angle applied to its body. Tooling is often aluminum, cast iron, or stainless steel. The precision of the produced prism or wedge is heavily predicated on:

Generally, tooling must be much more precise that the component it is producing. The system to be statistically capable needs to be 2-3 times more precise than the tolerance it is producing.

As an example, the following description is provided for comparison purposes only. To produce a prism with a tolerance of 1.5 arc minutes, the tooling has to be precise to 0.00245"/0.062 mm over a 6"/150 mm of working distance. To produce a prism with a tolerance of 5 arc seconds, the tooling has to be precise to 0.000145"/0.00362 mm over a 6"/150 mm working distance.

The tooling to produce the 5 arc second prism must be 16.8× as precise as the tooling required for a 1.5 arc minute prism. These values do not take into account the requirements of a statistically capable system.

To put these values into further perspective, the value of 0.00245" over a 6" tool is the same as a 1" deviation over 204 feet. The value of 0.000145" over the 6" tool is the same as a 1" deviation over 3448 feet.

In various manufacturers advertise and purport to supply prisms capable of 1.5 arc minutes of tolerance in production values. This 1.5 arc minute value appears to be the statistical limit of the current production process. It is well understood that as a process approaches its statistical process limits, requesting a 16.8× increase in precision is not practical and is impossible without introducing a new method of production.

The production of the tooling is a time consuming process in which the resulting angles produced to create the prism are initially constrained by the precision of the tooling. NOTE: Extremely precise tooling can be required, which can cost thousands of US dollars per unit.

Once the tooling is created mounting the glass to the tooling creates the next series of tolerance issues as indexing faces of the glass precisely to a machined surface is problematic. As is understood attaching a glass body (prism) to a metal or glass tool (or any suitable material) cannot be done without a bonding agent. Adhesives, pitches, waxes, paraffins, tapes, plaster, UV are among the common materials to attach the glass to the tooling.

The bonding agents will have viscosities to overcome. Viscous materials will prevent intimate contact of the glass to the tool creating a separation layer. This separation layer must be controlled. An inconsistent separation layer will increase tolerances.

Heat is often involved. Working with heat (150° F. to 300° F.) adds a further complexity to the handling of the materials.

Debris within the bonding agent will either keep intimate contact from occurring or as intimate contact is approached the glass surfaces will be damaged by the debris. The lack of intimate contact will not allow the surface of the glass to be at the same surface of plane as the tooling. This variation will add to tolerances.

Separation barriers are used to protect the surface of the glass as it comes into intimate contact with the tooling. The separation material must be very precise in its own nature. Paper, tissue, screen print cloth, or some form of pitch (adhesive) is normally used. However finding a statistically capable paper, tissue, or cloth capable of 0.000145 tolerances is currently not possible. Furthermore, a Pitch process requires heat, viscosity of the liquids involved will separate the glass and metal surfaces of the tooling both of which combine to create tolerance issues/buildup.

This separation barrier now introduce potentially two layers of viscous material.

The separation layer must contend with heat and blocking material absorption or displacement. As the material absorbs the blocking material its size will change.

Cleanliness is paramount. The tolerance requested is 21× smaller than a human hair. The ability of the operator to consistently place a glass surface precisely onto a second hard surface to the tolerances required is essentially not possible with existing techniques.

Finally, machining processes are employed, rough grinding, fine grinding, and polishing. Each of these machining processes will introduce variances within the process. These processes are not automated and rely on the skills of a production employee. The machines must be capable of 0.000145" precision over 6" (in this example). This includes all mounting surfaces and their upkeep.

The above sequence assumes that a prism that meets maximum deviation of the requested value. As is understood a process should be at least 3× more capable than the required resulting measured value. The full interaction of the above processes need to be able to control their processes to 0.0000483"/0.00122 mm or 48 millionths over 6"/150-mm.

This is done today by highly skilled technicians producing one prism body at a time. As is well understood if a human is involved statistical capability is dramatically reduced. Therefore to produce a 5 arc second prism in production with today's known method is impossible.

Furthermore, a prism that is rejected will undergo a full repeat of the process or an individual remanufacture. This reprocess is very costly and the success is highly questionable.

A prism that requires final tolerance outputs of degrees is readily available in today's market. As prisms final tolerance outputs approach less than 2 arc minute angle requirements, tooling, process, and control become a greater issue and the number of suppliers are reduced and costs rapidly climb.

These constraints limit the application of precision prism optics, limit the application to the potential market, and the introduction of new markets and/or components due to the current process limits. If statistical process requirements are applied, an even greater restriction is applied to the potential market.

By way of example, a 90° prism 25 mm in size with a 5 arc minute tolerance would cost $30, 90° prism 25 mm in size with a 2 arc minute tolerance would cost $52, and a 90° prism 25 mm in size with a +/−15 second tolerance could cost $90. Even within these examples, prisms within certain tolerances are not actually processed to the desired specification, but are obtained through a sorting process applied to randomly produced prisms. Thus, the resulting specification results of a sort and meeting a number.

Prisms with angular tolerances of less than +/−15 arc seconds cannot easily be found. Certain prisms can be produced down to 1 arc second, but the rapidly increasing costs associated with tighter angle bodies and limited capacity are prohibitive. Certainly not applicable to a consumer commercial market.

Thus, prisms of less than +/−15 arc seconds are not currently available in commercially practical volumes or at commercially acceptable pricing.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE PRESENT DISCLOSURE

Currently, there are applications that require precision optical wedges and prisms and/or include a requirement to bend light much more precisely than what are is currently available. However, consistent production of precision optical wedges and prisms having a 5 arc second prism, using known systems and methods is impossible, no existing adhesively bonded precision optical wedges and prisms with specific target angles can be found, and no commercially available <5 arc second optical wedges or prisms can be found.

Current production methods do not allow a standard production facility with persons of ordinary skill to produce high precision optical wedges and prisms. In addition, current methods are very costly, of limited capacity, and cannot be readily applied to a sustainable predictable quality expectation. Current methods are not statistically capable of producing less than 15 arc seconds in any appreciable production volume. Furthermore, current methods are restricting the ability to introduce new markets and new components due to the inability to produce precision wedges and prisms. In addition, single prototype applications are currently extremely costly.

Exemplary, nonlimiting embodiments of methods for producing precision optical wedges and prisms are shown and described herein. The disclosed methods and assemblies will, for example, provide for the production of a wedge style prism at a greatly reduced cost, as compared to current prism production, and tolerances less than ½ of the currently available commercially available prisms.

A method is described that allows a high volume production of precise wedge and or prism angles and or optics. This method allows the production of individual units and or allow the a rapid low cost method of correction or designed final precision output/input light path values as applied to a complex multi sided prism device. Current methods rapidly reach production limits concerning the precision that can be produced while meeting production volumes and still meet a statistically viable stable system of production. The process produces a type of prism not available in the market place which allows existing markets to be improved and allow new markets and product lines to exist. This method will allow the introduction of components that are currently not feasible today do to cost, statistically capable process, and volumes. This same method can be used to modify/enhance/purposely produce complex prism bodies with precise operating angles at a dramatically lower cost.

Accordingly, the present disclosure provides methods that allow for the production of sub arc minute optical wedges, prisms, and optics. The presently disclosed methods will allow the production of standalone optics or can be used to rapidly create critical adjustments to complex prism bodies at a drastically reduced cost, reduced skilled labor requirements, higher yield, higher production outputs than is currently available to the manufacturing institutes. The presently disclosed methods produce components at tolerances, in production rates, and in volumes that are not currently feasible.

According to various exemplary, nonlimiting embodiments, a method for producing precision optical wedges and prisms comprises producing two or more low cost prisms: separating the produced prisms into pairs; indexing the prism pairs into a left prism and a right prism; and producing a prism assembly from the left prism and right prism.

In various exemplary, nonlimiting embodiments, an image will shift left in the left prism and will shift right in the right prism. When the left prism and right prism are used to create a pair, when viewed as a pair, as a near neutral window. The two opposite angles will cancel each other producing a near zero shifted transmitted wave.

In various exemplary, nonlimiting embodiments, the prism assembly is produced by adhesively attaching or coupling the left prism and right prism.

In various exemplary, nonlimiting embodiments, the method for producing an optical wedge or prism assembly comprises identifying a first prism wedge and a second prism wedge, wherein said first prism wedge includes at least one wedge surface and wherein said second prism wedge includes a wedge surface; indexing said identified first prism wedge and said identified second prism wedge such that said wedge surface of said first prism wedge is aligned adjacent said wedge surface of said second prism wedge; applying an adhesive to at least one of said adjacent wedge surfaces of said first prism wedge and said second prism wedge; manipulating said first prism wedge and/or said second prism wedge to obtain a desired angle; and allowing said adhesive to cure.

In various exemplary, nonlimiting embodiments, an angle formed by said first wedge surface and an angle formed by said second wedge surface are supplementary angles.

In various exemplary, nonlimiting embodiments, the method further comprises determining whether said prism assembly is at said desired angle and, if it is determined that said resultant prism is not at said desired angle: separating said first prism wedge from said second prism wedge; cleaning said wedge surface of said first prism wedge and said wedge surface of said second prism wedge; indexing said first prism wedge and said second prism wedge such that said wedge surface of said first prism wedge is aligned adjacent said wedge surface of said second prism wedge; applying an adhesive to at least one of said adjacent wedge surfaces of said first prism wedge and said second prism wedge; manipulating said first prism wedge and/or said second prism wedge to obtain a desired angle; and allowing said adhesive to cure.

In various exemplary, nonlimiting embodiments, manipulating said first prism wedge and/or said second prism wedge to obtain a desired angle comprises rotating said first prism wedge and/or said second prism wedge.

In various exemplary, nonlimiting embodiments, said first prism wedge comprises a right cylinder having a wedge surface, a side surface, and an outer surface.

In various exemplary, nonlimiting embodiments, said second prism wedge comprises a right cylinder having a wedge surface, a side surface, and an outer surface.

In various exemplary, nonlimiting embodiments, said first prism wedge comprises an outer surface that is substantially perpendicular to a side surface of said first prism wedge.

In various exemplary, nonlimiting embodiments, said second prism wedge comprises an outer surface that is substantially perpendicular to a side surface of said second prism wedge.

In various exemplary, nonlimiting embodiments, the method for producing an optical wedge or prism assembly comprises identifying a pair of prism wedges, wherein each prism wedge comprises a wedge surface; indexing said identified pair of prism wedges such that said wedge surfaces are adjacent to one another; applying an adhesive to adjacent wedge surfaces of said aligned prism wedges; manipulating at least one of said prism wedges relative to said other prism wedge to obtain a desired angle between said outer surfaces of said prism wedges; and allowing said adhesive to cure.

In various exemplary, nonlimiting embodiments, each wedge surface is defined by passing a diagonal cutting plane through said prism wedge.

In various exemplary, nonlimiting embodiments, each prism wedge comprises a right cylinder having an outer surface.

In various exemplary, nonlimiting embodiments, each prism wedge comprises a right cylinder having a side surface.

In various exemplary, nonlimiting embodiments, an angle formed by each of said wedge surfaces are supplementary angles.

In various exemplary, nonlimiting embodiments, manipulating at least one of said prism wedges relative to said other prism wedge comprises rotating said first prism wedge and/or said second prism wedge.

In various exemplary, nonlimiting embodiments, the optical wedge or prism assembly is produced by identifying a first prism wedge and a second prism wedge, wherein said first prism wedge includes at least one wedge surface and wherein said second prism wedge includes a wedge surface; indexing said first prism wedge and said second prism wedge such that said second prism wedge is rotated approximately 90° relative to said first prism wedge and such that wedge surfaces of said first prism wedge and said second prism wedge are adjacent to one another; applying an adhesive to adjacent wedge surfaces of said aligned prism wedges; manipulating at least one of said prism wedges relative to said other prism wedge to obtain a desired angle between said outer surfaces of said prism wedges; and allowing said adhesive to cure to form said optical wedge or prism assembly.

In various exemplary, nonlimiting embodiments, each wedge surface is defined by passing a diagonal cutting plane through said prism wedge.

In various exemplary, nonlimiting embodiments, an angle formed by said first wedge surface and an angle formed by said second wedge surface are supplementary angles.

In various exemplary, nonlimiting embodiments, each prism wedge comprises a right cylinder having a side surface.

In various exemplary, nonlimiting embodiments, each prism wedge comprises an outer surface that is substantially perpendicular to a side surface of each prism wedge.

In various exemplary, nonlimiting embodiments, manipulating at least one of said prism wedges relative to said other prism wedge comprises rotating said first prism wedge and/or said second prism wedge.

Accordingly, the presently disclosed systems, methods, and/or apparatuses separately and optionally provide methods that provide for precision optical wedge and prism assembly at increased production rates and volumes.

The presently disclosed systems, methods, and/or apparatuses separately and optionally provide methods that allow precision optical wedges and prisms to be produced without the use of highly skilled technicians.

The presently disclosed systems, methods, and/or apparatuses separately and optionally provide methods that allow precision optical wedges and prisms to be produced using standard measuring methods.

The presently disclosed systems, methods, and/or apparatuses separately and optionally provide methods that allow precision optical wedges and prisms to be produced at a reduced failure rate.

The presently disclosed systems, methods, and/or apparatuses separately and optionally provide methods that allow precision optical wedges and prisms to be produced at a reduced manufacturing cost.

The presently disclosed systems, methods, and/or apparatuses separately and optionally provide methods that allow precision optical wedges and prisms to be produced utilizing standard prism processes.

The presently disclosed systems, methods, and/or apparatuses separately and optionally provide methods that dramatically reduce the cost of prototype applications. One unit of a specific angle, with tolerances of less than 15 arc seconds (5 seconds is common), can rapidly be produced with economical means.

The presently disclosed systems, methods, and/or apparatuses separately and optionally provide methods that allow precision optical wedges and prisms to be produced utilizing standard tooling.

The presently disclosed systems, methods, and/or apparatuses separately and optionally provide methods that allow precision optical wedges and prisms to be produced with a drastic reduction in repair loops.

The presently disclosed systems, methods, and/or apparatuses separately and optionally provide methods that allow precision optical wedges and prisms to be produced to increase vendor choices.

The presently disclosed systems, methods, and/or apparatuses separately and optionally provide methods that produce <10 arc second prism wedge and wedge bodies at commercially viable production output and costs.

These and other aspects, features, and advantages of the presently disclosed systems, methods, and/or apparatuses are described in or are apparent from the following detailed description of the exemplary, non-limiting embodiments of the presently disclosed systems, methods, and/or apparatuses and the accompanying figures. Other aspects and features of embodiments of the presently disclosed systems, methods, and/or apparatuses will become apparent to those of ordinary skill in the art upon reviewing the following description of specific, exemplary embodiments of the presently disclosed systems, methods, and/or apparatuses in concert with the figures. While features of the presently disclosed systems, methods, and/or apparatuses may optionally be discussed relative to certain embodiments and figures, all embodiments of the presently disclosed systems, methods, and/or apparatuses can include one or more of the features discussed herein.

Further, while one or more embodiments may optionally be discussed as having certain advantageous features, one or more of such features may optionally also be used with the various embodiments of the systems, methods, and/or apparatuses discussed herein. In similar fashion, while exemplary embodiments may optionally be discussed below as device, system, or method embodiments, it is to be understood that such exemplary embodiments can be implemented in various devices, systems, and methods of the presently disclosed systems, methods, and/or apparatuses.

Any benefits, advantages, or solutions to problems that are described herein with regard to specific embodiments are not intended to be construed as a critical, required, or essential feature(s) or element(s) of the presently disclosed systems, methods, and/or apparatuses or the claims.

BRIEF DESCRIPTION OF THE SEVERAL VIEWS OF THE DRAWINGS

As required, detailed exemplary embodiments of the presently disclosed systems, methods, and/or apparatuses are disclosed herein; however, it is to be understood that the disclosed embodiments are merely exemplary of the presently disclosed systems, methods, and/or apparatuses that may optionally be embodied in various and alternative forms, within the scope of the presently disclosed systems, methods, and/or apparatuses. The figures are not necessarily to scale; some features may optionally be exaggerated or minimized to illustrate details of particular components. Therefore, specific structural and functional details disclosed herein are not to be interpreted as limiting, but merely as a basis for the claims and as a representative basis for teaching one skilled in the art to employ the presently disclosed systems, methods, and/or apparatuses.

The exemplary embodiments of the presently disclosed systems, methods, and/or apparatuses will be described in detail, with reference to the following figures, wherein like reference numerals refer to like parts throughout the several views, and wherein.

DETAILED DESCRIPTION OF EXEMPLARY EMBODIMENTS OF THE DISCLOSURE

For simplicity and clarification, the design factors and operating principles for producing optical wedges and prisms according to the presently disclosed systems, methods, and/or apparatuses are explained with reference to various exemplary embodiments of methods for producing optical wedges and prisms systems, methods, and apparatuses according to the presently disclosed systems, methods, and/or apparatuses. The basic explanation of the design factors and operating principles of the methods for producing optical wedges and prisms systems, methods, and apparatuses is applicable for the understanding, design, and operation of the methods for producing optical wedges and prisms systems, methods, and apparatuses of the presently disclosed systems, methods, and/or apparatuses. It should be appreciated that the methods for producing optical wedges and prisms systems, methods, and apparatuses can be adapted to many applications where methods for producing optical wedges and prisms systems, methods, and apparatuses can be used.

As used herein, the word "may" is meant to convey a permissive sense (i.e., meaning "having the potential to"), rather than a mandatory sense (i.e., meaning "must"). Unless stated otherwise, terms such as "first" and "second" are used to arbitrarily distinguish between the exemplary embodiments and/or elements such terms describe. Thus, these terms are not necessarily intended to indicate temporal or other prioritization of such exemplary embodiments and/or elements.

The term "coupled", as used herein, is defined as connected, although not necessarily directly, and not necessarily mechanically. The terms "a" and "an" are defined as one or more unless stated otherwise.

The term "exemplary" is used herein to mean "serving as an example, instance, or illustration". Any embodiment described herein as "exemplary" is not necessarily to be construed as preferred or advantageous over other embodiments. Likewise, the term "embodiment" does not require that all embodiments of the invention include the discussed feature, advantage, or mode of operation.

Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and will "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises", "has", "includes" or "contains" one or more operations possesses those one or more operations but is not limited to possessing only those one or more operations.

Aspects of the invention are disclosed in the following description and related drawings directed to exemplary embodiments of the invention. Alternate embodiments may optionally be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

It should also be appreciated that the terms "prism", "optical wedge", "lens", and "optic" are used for basic explanation and understanding of the operation of the systems, methods, and apparatuses of the presently disclosed systems, methods, and/or apparatuses. Therefore, the terms "prism", "optical wedge", "lens", and "optic" are not to be construed as limiting the systems, methods, and apparatuses of the presently disclosed systems, methods, and/or apparatuses.

Figure 1A:
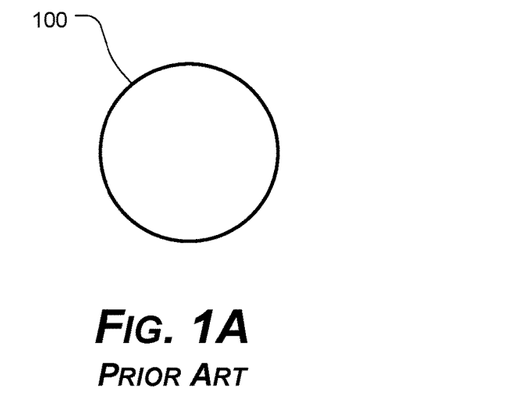
FIG. 1A illustrates top view of an exemplary embodiment of a standard prism.
Figure 1B:
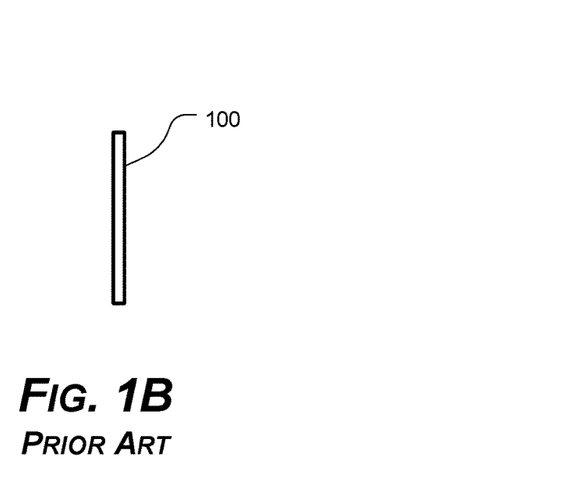
FIG. 1B illustrates side view of an exemplary embodiment of a standard prism.
Figure 2:
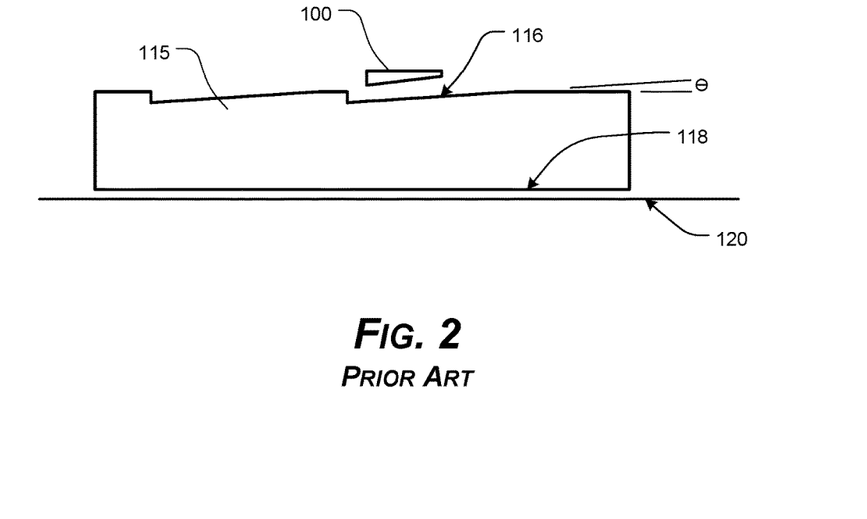
FIG. 2 illustrates a side view of a typical prism tool.

Turning now to the appended drawing figures, FIGS. 1A, 1B, and 2 illustrate an exemplary embodiment of a standard prism 100 produced using a known tooling body 115. For example, the standard prism 100 is produced as a single body on standard prism plates.

A standard, typical production, prism 100 has a diameter of approximately 54.36 mm±0.025 mm and is approximately 2.54 mm±0.0127 mm thick. The edges are typically broken at 0.025 mm. The typical production angle of the prison 100 is approximately 0.326°±1.5 arc minutes. The figure ±1.5 arc minutes is a typical value found in the optical industry.

Generally, the standard prism 100 has a transmitted angle θ of approximately 10 Minutes of Angle (MOA) with an angle tolerance of plus or −1.5 MOA.

As illustrated in FIG. 2, the tooling body 115 is a typical prism tool. The angle surface 116 is used to produce a resulting angle on the standard prism 100. Each surface, including the angle surface 116, a bottom surface 118 of the tooling body 115, and a machine surface 120, must have a total/additive tolerance of less than 1.5 arc minutes. Thus, for example, the angle surface 116, the bottom surface 118, and the machine surface 120 must be capable of holding less than 0.00245 inches of error over a 6 inch length.

As illustrated in exemplary FIGS. 3-10, to begin utilizing the systems and methods of the present disclosure, two low cost prisms (a first prism wedge 210 and a second prism wedge 220) are provided or produced. Each of the first prism wedge 210 and the second prism wedge 220 has a typical output value of +/−1.5 arc minutes using current high production processes. Thus, it should be appreciated that the first prism wedge 210 and the second prism wedge 220 may be produced to current standard quality levels and production angle levels/abilities.

Figure 3:
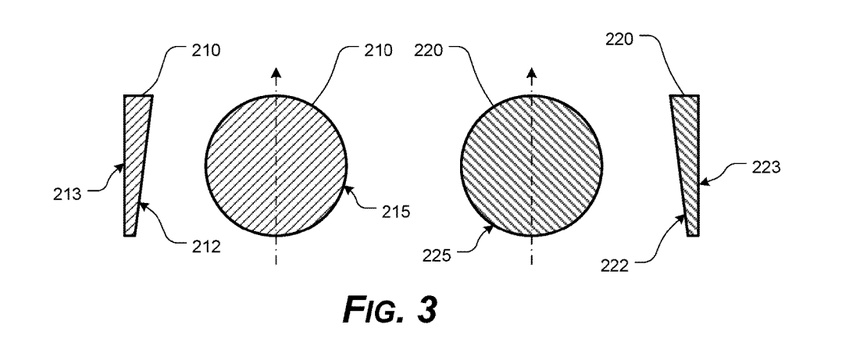
FIG. 3 illustrates an exemplary pair of standard quality prism wedges, selected according to the present disclosure.

In various exemplary embodiments, each of the first prism wedge 210 and the second prism wedge 220 is generally in the form of a right cylinder having a wedge surface 212 and 222, respectively, formed by passing a diagonal cutting plane through the right cylinder. This results in the wedge surfaces 212 and 222, respectively, forming generally elliptical surfaces.

In various exemplary embodiments, an angle formed by the first wedge surfaces 212 and 222 are supplementary angles or approximately supplementary angles. In these cases, the sum of the angles formed by the first wedge surface 212 and the angle formed by the second wedge surface 222 is equal to 180.

It should be appreciated that these are merely exemplary forms of the first prism wedge 210 and the second prism wedge 220 and the wedge surface 212 and 222, respectively. Thus, the first prism wedge 210 and the second prism wedge 220 may take any desired overall shape or form and the final form of each is a design choice based upon the desired overall shape, functionality, and/or appearance of the resultant single optical wedge or prism assembly 600.

When aligned, as further described herein, each of the first prism wedge 210 and the second prism wedge 220 also has an outer surface 213 and 223, respectively. In various exemplary embodiments, each outer surface 213 and 223 is substantially perpendicular to a side surface 215 and 225, respectively, of each respective first prism wedge 210 and second prism wedge 220. When the first prism wedge 210 and the second prism wedge 220 are attached or coupled together to form the optical wedge or prism assembly 600, planes defined by the outer surfaces 213 and 223 are utilized to determine the target angle of the produced optical wedge or prism assembly 600.

Once produced and identified, the first prism wedge 210 and the second prism wedge 220 are paired. One of the paired first prism wedge 210 and second prism wedge 220 is indexed as a right prism wedge and the other of the paired first prism wedge 210 and second prism wedge 220 is indexed as a left prism wedge.

In various exemplary embodiments, and image will shift left in the left prism wedge and will shift right in the right prism wedge. This will create a pair. When viewed as a pair, the indexed right prism wedge and left prism wedge will produce a near neutral window. The two opposite angles will cancel each other producing a near zero shifted transmitted wave. This pre-selection process will speed up the assembly time.

Figure 4:
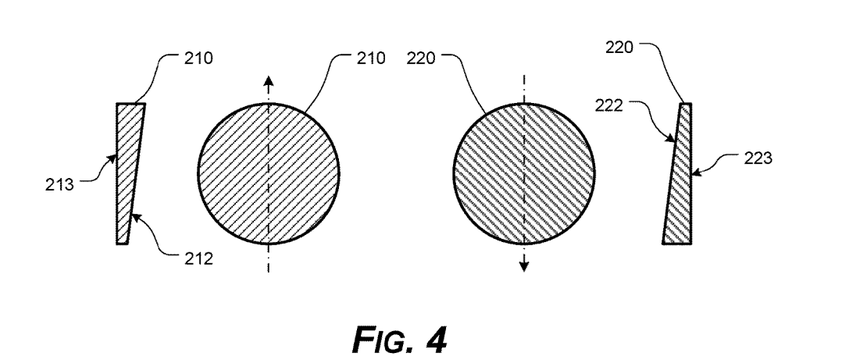
FIG. 4, illustrates an exemplary pair of standard quality prism wedges, with one of the prism wedges rotated approximately 90° relative to the other prism wedge, according to the present disclosure.

In various exemplary embodiments, the paired first prism wedge 210 and second prism wedge 220 are indexed so that they are aligned 180° opposite of one another, as illustrated in FIG. 4.

In certain exemplary, nonlimiting embodiments, the alignment of the paired first prism wedge 210 and second prism wedge 220 is performed utilizing an alignment device 610. In various exemplary embodiments, the alignment device 610 comprises an Autocollimator, Interferometer, Laser and Target, a target, or a custom unit that can read sufficiently to sub minute angles. This step is not required to produce the final product, but is recommended in order to expedite final assembly thru reduced handling and a reduction in the chance of contaminating other surfaces with adhesive 500. Each of the above can be used to index the pair during assembly. The choice will be driven by the precision needed and the speed required.

The indexing of the first prism wedge 210 relative to the second prism wedge 220 allows for rapid indexing of small angle shifts. The same process could also allow a 45° index or a 90° index, allowing other larger angles to be rapidly index larger angles in the assembly line.

Figure 5A:
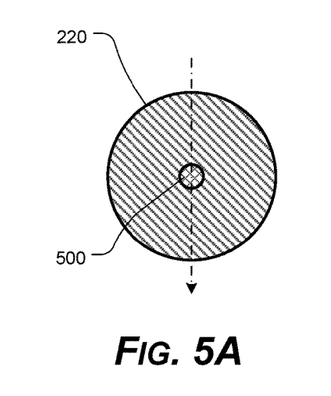
FIG. 5A illustrates a front view showing an exemplary optical adhesive or optical tape applied to one surface of one of the exemplary pair of standard quality prism wedges, according to the present disclosure.
Figure 5B:
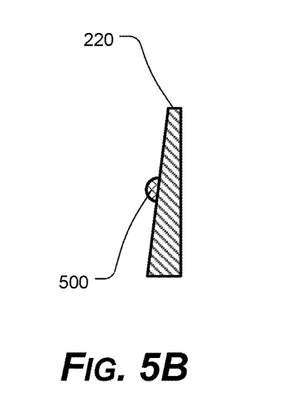
FIG. 5B illustrates a side view showing an exemplary optical adhesive or optical tape applied to one surface of one of the exemplary pair of standard quality prism wedges, according to the present disclosure.

As illustrated in FIGS. 5A and 5B, a portion or determined amount of optical tape or optical adhesive 500 is applied to the wedge surface 212 and/or the wedge surface 222 of one or both of the paired first prism wedge 210 and/or second prism wedge 220. Other methods of final adhesion can be applied.

In certain exemplary embodiments, the adhesive 500 is applied to the wedge surface 212 and/or the wedge surface 222 of one or both of the paired first prism wedge 210 and second prism wedge 220. For example, one or more drops of a UV curable adhesive 500 may be applied proximate a center of one of wedge surface 212 and/or the wedge surface 222 of one or both of the paired first prism wedge 210 and second prism wedge 220. The applied adhesive 500 should be sufficient to wet the full adjacent wedge surface 212 or wedge surface 222 when the adjacent wedge surface 212 and wedge surface 222 of the paired first prism wedge 210 and second prism wedge 220 are brought a sufficient distance from one another.

In various exemplary embodiments, adhesion of the paired first prism wedge 210 and second prism wedge 220 may be accomplished by ultraviolet (UV) curing glue or adhesive, a heat reactive adhesive, other glues or adhesives capable of producing an optically acceptable image, tapes, mechanical devices, welding, or the like.

In certain exemplary embodiments, UV curable adhesives are recommended due to the near instantaneous initial cure, which reduces the chance for the paired first prism wedge 210 and second prism wedge 220 to move and alter the target angle.

Figure 6:
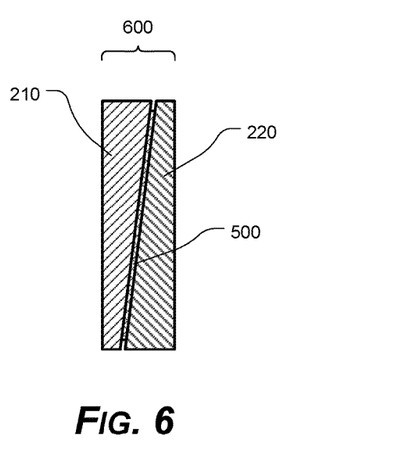
FIG. 6 illustrates the exemplary pair of prism wedges, being brought into contact, according to the present disclosure.

As illustrated in FIG. 6, the adjacent wedge surface 212 and wedge surface 222 of the paired first prism wedge 210 and second prism wedge 220 are brought towards one another, via manual or mechanical means, spreading the adhesive 500. Depending on the type and viscosity of the adhesive 500, the distance maintained between the adjacent wedge surface 212 and wedge surface 222 of the paired first prism wedge 210 and second prism wedge 220 can be dictated based upon the amount of pressure applied to urge the first prism wedge 210 toward the second prism wedge 220.

It should be appreciated that methods are not restricted to an adhesive and may include or adhere tape, periphery mounting, direct clamping as required to retain the target angle of the device or any other method to retain the target relationship between the paired first prism wedge 210 and second prism wedge 220.

Figure 7:
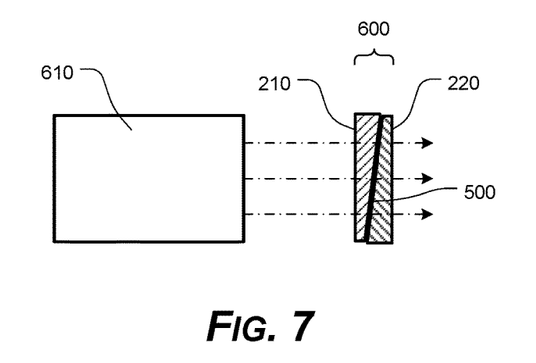
FIG. 7 illustrates the exemplary pair of prism wedges being rotationally aligned utilizing an alignment device, according to the present disclosure.

As illustrated in FIG. 7, the paired first prism wedge 210 and second prism wedge 220 are adhesively attached or coupled as a single optical wedge or prism assembly 600. A method of viewing the resulting angle is represented by the alignment device 610.

Figure 8:
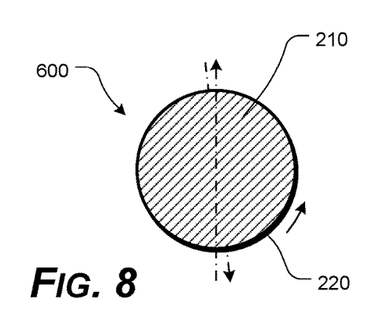
FIG. 8 illustrates the prism wedges rotationally aligned, according to the present disclosure.
Figure 9:
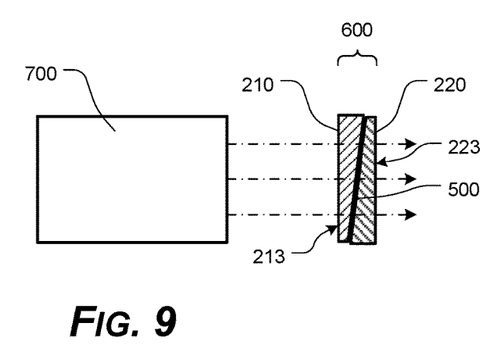
FIG. 9 illustrates the prism wedges being attached or coupled, according to the present disclosure.

As illustrated in FIG. 8, the paired first prism wedge 210 and second prism wedge 220 are rotated relative to each other by finger/hand or by mechanical means until the desired angle is achieved. It should be appreciated that this method can quickly produce single digit or lower target angles.

In various exemplary embodiments, the two paired first prism wedge 210 and second prism wedge 220 (the first prism wedge 210 and the second prism wedge 220) are initially aligned, the adhesive is applied, and at least one of the first prism wedge 210 or the second prism wedge 220 is at least partially positioned within a measuring cavity of a measuring device.

The remaining first prism wedge 210 or second prism wedge 220 is aligned in the measurement cavity. In various exemplary embodiments, contact between the adjacent wedge surface 212 and wedge surface 222 of the paired first prism wedge 210 and second prism wedge 220 and the adhesive 500 is created. This will reduce the likelihood of damaging the adjacent wedge surface 212 and wedge surface 222 as the paired first prism wedge 210 and second prism wedge 220 are manipulated to achieve the desired target angle, as measured relative to the planes defined by the outer surfaces 213 and 223 are utilized to determine the target angle of the produced optical wedge or prism assembly 600. This is not required, but it is recommended.

One or both of the paired first prism wedge 210 and second prism wedge 220 is manipulated to achieve the desired target angle. Using this method, alignment of the paired first prism wedge 210 and second prism wedge 220 to within a single arc second is relatively easily achieved.

Next, the paired first prism wedge 210 and second prism wedge 220 are brought closer together and the adhesive 500 is forced to the outsides of the pair of prism wedges. So long as the paired first prism wedge 210 and second prism wedge 220 are urged together without being twisted relative to one another, the desired target angle is maintained.

At this point, a final check may be performed, within the measurement cavity, to determine whether the assembly meets the desired target angle. If not, final alignment adjustments can be made.

Once it is determined that the optical wedge or prism assembly 600 meets the desired target angle, the adhesive is cured, as required. In exemplary FIG. 9, the optical wedge or prism assembly 600 is then cured. In this example, a UV light 700 is used. However, it should be appreciated that complete curing of the assembly may optionally be accomplished by the application of heat, over time, or the like. It should be appreciated that various methods that are understood by a person of sufficient skill can be applied as required. All methods of attachment are not shown as a person of sufficient skill can apply various methods to hold a unit in a required position.

The disclosed methods are able to produce a less than 15 second prism wedge lens, using basic production procedures. The above applications are for exemplary purposes and it may be understood by a person having ordinary skill optical production, measurement, assembly, and inspection of optical components.

If, once cured, it is determined that the desired target angle was not achieved, the paired first prism wedge 210 and second prism wedge 220 may be separated from one another. In various exemplary embodiments, separation is accomplished through a decreasing, solvent, or heat application process. Once separated, the outer surfaces of the paired first prism wedge 210 and second prism wedge 220 are cleaned, to remove any remaining adhesive 500. Then, the cleaned paired first prism wedge 210 and second prism wedge 220 may be utilized again to create a prism assembly. In various exemplary embodiments, a physical regrind polish of the paired first prism wedge 210 and second prism wedge 220 is not necessary.

Figure 10:
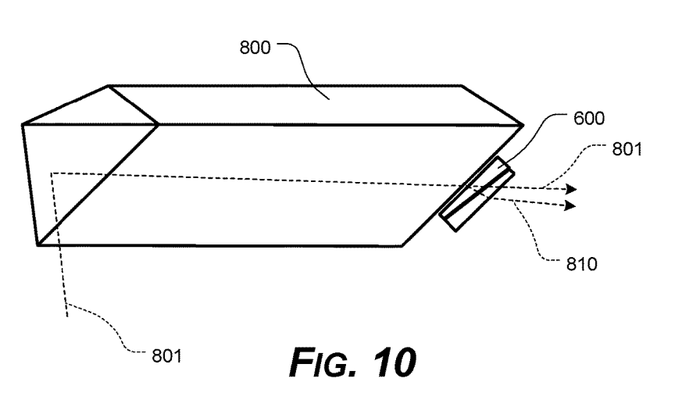
FIG. 10 illustrates the optical wedge or prism assembly applied to a complex prism, according to the present disclosure.

As illustrated in FIG. 10, the noted method of assembly as it would be applied to a complex prism or light pipe. The complex prism 800 has a light beam 801 entering the complex prism 800. The uncorrected beam 801 leaves the complex prism 800 with error induced by the complex prism 800 manufacture in a direction not optimal to design or in error of design. Adding the optical wedge or prism assembly 600, produced using the noted method, will create a light beam 810, correcting the complex prism 800 precisely and for a very low cost.

Figure 11:
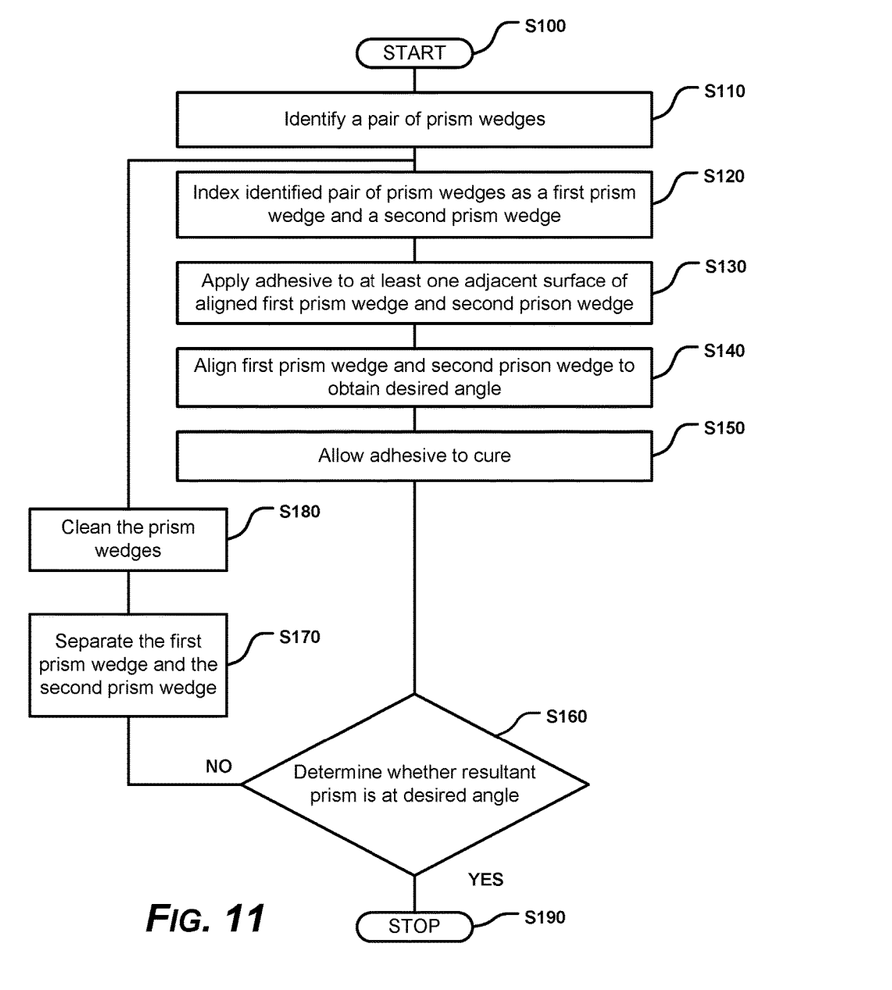
FIG. 11 illustrates an exemplary flowchart outlining the steps for producing optical wedges and prisms, according to the present disclosure.

FIG. 11 illustrates an exemplary method for producing an optical wedge or prism assembly 600. As illustrated, the method begins in step S100 and continues to step S110, wherein, a first prism wedge 210 and a second prism wedge 220 are identified and paired. Then, in step S120, the paired first prism wedge 210 and second prism wedge 220 are indexed relative to one another.

Then, in step S130, a portion or determined amount of optical tape or optical adhesive 500 is applied to the wedge surface 212 and/or the wedge surface 222 of one or both of the paired first prism wedge 210 and/or second prism wedge 220. When the adhesive 500 has been applied to the wedge surface 212 and/or the wedge surface 222 of one or both of the paired first prism wedge 210 and second prism wedge 220, the method continues to step S140 and at least one of the paired first prism wedge 210 and second prism wedge 220 is/are rotated relative to the other until the desired target angle is achieved.

Then, in step S150, the adhesive 500 is cured.

Once the adhesive 500 has been appropriately cured, the method advances to step S160 and a determination is made as to whether the paired first prism wedge 210 and second prism wedge 220 are still at the desired target angle. If, in step S160, it is determined that the desired target angle was not achieved, the method optionally advances to step S170 and the paired first prism wedge 210 and second prism wedge 220 are separated from one another. Then, in step S180, the outer surfaces of the paired first prism wedge 210 and second prism wedge 220 are cleaned to remove any remaining adhesive 500. Then, the method returns to step S120.

If, in step S160, it is determined that the desired target angle was achieved, the method advances to step S190 and ends.

The foregoing description and accompanying drawings illustrate the principles, preferred embodiments, and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

It should also be appreciated that a more detailed explanation of the instructions regarding how to produce optical wedges and prisms, methods for producing final alignment of assembled paired first prism wedge 210 and second prism wedge 220, and certain other items and/or techniques necessary for the implementation and/or operation of the various exemplary embodiments of the presently disclosed systems, methods, and/or apparatuses are not provided herein because such elements are commercially available and/or such background information will be known to one of ordinary skill in the art. Therefore, it is believed that the level of description provided herein is sufficient to enable one of ordinary skill in the art to understand and practice the presently disclosed systems, methods, and/or apparatuses, as described.

While the presently disclosed systems, methods, and/or apparatuses has been described in conjunction with the exemplary embodiments outlined above, the foregoing description of exemplary embodiments of the presently disclosed systems, methods, and/or apparatuses, as set forth above, are intended to be illustrative, not limiting and the fundamental disclosed systems, methods, and/or apparatuses should not be considered to be necessarily so constrained. It is evident that the presently disclosed systems, methods, and/or apparatuses is not limited to the particular variation set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the presently disclosed systems, methods, and/or apparatuses. The upper and lower limits of these smaller ranges may independently be included in the smaller ranges and is also encompassed within the presently disclosed systems, methods, and/or apparatuses, subject to any specifically excluded limit in the stated range. Where the stated range includes one or both of the limits, ranges excluding either or both of those included limits are also included in the presently disclosed systems, methods, and/or apparatuses.

It is to be understood that the phraseology of terminology employed herein is for the purpose of description and not of limitation. Unless defined otherwise, all technical and scientific terms used herein have the same meaning as commonly understood by one of ordinary skill in the art to which the presently disclosed systems, methods, and/or apparatuses belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the presently disclosed systems, methods, and/or apparatuses, such that others may, by applying current knowledge, change, vary, modify, and/or adapt these exemplary, non-limiting embodiments for various applications without departing from the spirit and scope of the presently disclosed systems, methods, and/or apparatuses and elements or methods similar or equivalent to those described herein can be used in practicing the presently disclosed systems, methods, and/or apparatuses. Any and all such changes, variations, modifications, and/or adaptations should and are intended to be comprehended within the meaning and range of equivalents of the disclosed exemplary embodiments and may optionally be substituted without departing from the true spirit and scope of the presently disclosed systems, methods, and/or apparatuses.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A method for producing an optical wedge or prism assembly, comprising:
    selecting a first prism wedge and a second prism wedge, wherein said first prism wedge includes at least one wedge surface and wherein said second prism wedge includes a wedge surface;
    indexing said identified first prism wedge and said identified second prism wedge such that said wedge surface of said first prism wedge is aligned adjacent said wedge surface of said second prism wedge;
    applying an adhesive to at least one of said adjacent wedge surfaces of said first prism wedge and said second prism wedge;
    rotating said first prism wedge relative to said second prism wedge to obtain a desired angle between an outer surface of said first prism wedge and an outer surface of said second prism wedge; and
    allowing said adhesive to cure between at least a portion of said wedge surface of said first prism wedge and at least a portion of said wedge surface of said second prism wedge.

2. The method of claim 1, wherein an angle formed by said first wedge surface and an angle formed by said second wedge surface are supplementary angles.

3. The method of claim 1, further comprising determining whether said prism assembly is at said desired angle and, if it is determined that said resultant prism is not at said desired angle:
    separating said first prism wedge from said second prism wedge;
    cleaning said wedge surface of said first prism wedge and said wedge surface of said second prism wedge;
    indexing said first prism wedge and said second prism wedge such that said wedge surface of said first prism wedge is aligned adjacent said wedge surface of said second prism wedge;
    applying an adhesive to at least one of said adjacent wedge surfaces of said first prism wedge and said second prism wedge;
    manipulating said first prism wedge relative to said second prism wedge to obtain a desired angle; and
    allowing said adhesive to cure.

4. The method of claim 1, wherein said first prism wedge is rotated relative to said second prism wedge within a measurement cavity.

5. The method of claim 1, wherein said first prism wedge comprises a right cylinder having a wedge surface, a side surface, and an outer surface.

6. The method of claim 1, wherein said second prism wedge comprises a right cylinder having a wedge surface, a side surface, and an outer surface.

7. The method of claim 1, wherein said first prism wedge comprises an outer surface that is substantially perpendicular to a side surface of said first prism wedge.

8. The method of claim 1, wherein said second prism wedge comprises an outer surface that is substantially perpendicular to a side surface of said second prism wedge.

9. A method for producing an optical wedge or prism assembly, comprising:
    selecting a pair of prism wedges, wherein each prism wedge comprises a wedge surface;
    indexing said identified pair of prism wedges such that said wedge surfaces are adjacent to one another;
    applying an adhesive to adjacent wedge surfaces of said aligned prism wedges;
    rotating at least one of said prism wedges relative to said other prism wedge to obtain a desired angle between outer surfaces of said prism wedges; and
    allowing said adhesive to cure.

10. The method of claim 9, wherein each wedge surface is defined by passing a diagonal cutting plane through said prism wedge.

11. The method of claim 9, wherein each prism wedge comprises a right cylinder.

12. The method of claim 9, wherein each prism wedge comprises a right cylinder having a side surface.

13. The method of claim 9, wherein an angle formed by each of said wedge surfaces are supplementary angles.

14. The method of claim 9, wherein allowing said adhesive to cure comprises allowing said adhesive to cure between at least a portion of said wedge surface of said first prism wedge and at least a portion of said wedge surface of said second prism wedge.

15. An optical wedge or prism assembly produced by:
    selecting a first prism wedge and a second prism wedge, wherein said first prism wedge includes at least one wedge surface and wherein said second prism wedge includes a wedge surface;
    indexing said first prism wedge and said second prism wedge such that said second prism wedge is rotated approximately 90° relative to said first prism wedge and such that wedge surfaces of said first prism wedge and said second prism wedge are adjacent to one another;
    applying an adhesive to adjacent wedge surfaces of said aligned prism wedges;
    rotating at least one of said prism wedges relative to said other prism wedge to obtain a desired angle between said outer surfaces of said prism wedges; and
    allowing said adhesive to cure to form said optical wedge or prism assembly.

16. The optical wedge or prism assembly of claim 15, wherein each wedge surface is defined by passing a diagonal cutting plane through said prism wedge.

17. The optical wedge or prism assembly of claim 15, wherein an angle formed by said first wedge surface and an angle formed by said second wedge surface are supplementary angles.

18. The optical wedge or prism assembly of claim 15, wherein each prism wedge comprises a right cylinder having a side surface.

19. The optical wedge or prism assembly of claim 15, wherein said outer surface of each prism wedge is substantially perpendicular to a side surface of each prism wedge.

20. The optical wedge or prism assembly of claim 15, wherein allowing said adhesive to cure comprises allowing said adhesive to cure between at least a portion of said wedge surface of said first prism wedge and at least a portion of said wedge surface of said second prism wedge.

* * * * *